United States Patent [19]

Takano et al.

[11] Patent Number: 5,395,525
[45] Date of Patent: Mar. 7, 1995

[54] APPARATUS FOR EXCHANGING SUBSTANCES

[75] Inventors: Hisateru Takano, c/o National Cardiovascular Center Research Institute, 7-1, Fujishiro-dai 5-chome, Suita-shi, Osaka 565; Haruhiko Akagi; Yoshiyuki Taenaka, all of Suita; Takanobu Aoyagi, Tokyo; Jun Kamo, Otake, all of Japan

[73] Assignee: Hisateru Takano, Osaka, Japan

[21] Appl. No.: 81,300

[22] PCT Filed: Oct. 21, 1992

[86] PCT No.: PCT JP92/01374
§ 371 Date: Oct. 29, 1993
§ 102(e) Date: Oct. 29, 1993

[87] PCT Pub. No.: WO98/07957
PCT Pub. Date: Apr. 29, 1993

[30] Foreign Application Priority Data

Oct. 23, 1991 [JP] Japan .................. 3-275774

[51] Int. Cl.6 ............................. B01D 63/00
[52] U.S. Cl. .................. 210/321.89; 210/321.88; 422/45; 422/48; 96/8; 96/10
[58] Field of Search ............ 210/321.89, 321.88, 210/500.23, 323.2, 321.78, 321.8, 645; 422/45, 48, 46; 604/4; 96/8, 10

[56] References Cited

U.S. PATENT DOCUMENTS

| | | | |
|---|---|---|---|
| 3,934,982 | 1/1976 | Arp . | |
| 4,312,757 | 1/1982 | Brumfield | 210/646 |
| 5,043,140 | 8/1991 | Combs | 422/48 |
| 5,263,924 | 11/1993 | Mathewson | 422/45 |
| 5,266,265 | 11/1993 | Raible | 422/48 |
| 5,270,005 | 12/1993 | Raible | 210/645 |

FOREIGN PATENT DOCUMENTS

| | | |
|---|---|---|
| 60-193469 | 10/1985 | Japan . |
| 63-189160 | 8/1988 | Japan . |
| 63-283709 | 11/1988 | Japan . |
| 2-41172 | 2/1990 | Japan . |
| 2-95378 | 4/1990 | Japan . |
| 3-126465 | 5/1991 | Japan . |
| 2092913 | 8/1982 | United Kingdom . |
| 8706151 | 10/1987 | WIPO . |
| 9305828 | 4/1993 | WIPO . |

Primary Examiner—Robert A. Dawson
Assistant Examiner—Ana M. Fortuna
Attorney, Agent, or Firm—Kramer, Brufsky & Cifelli

[57] ABSTRACT

An apparatus for exchanging substances, such as artificial lung, in which, for raising exchange efficiency by feeding liquid to the outer wall of hollow fiber membranes efficiently without channeling and for reducing the size of the apparatus, an exchanging part comprising a multitude of hollow fiber membrane (3) disposed cylindrically or annularly to permit liquid to flow through the hollow parts is provided, and a pump (P) is disposed on the inner periphery of said exchanging part so that liquid may continuously be fed to the hollow membrane vertically with respect to the axial direction of said hollow fiber membrane (3).

5 Claims, 5 Drawing Sheets

APPARATUS FOR EXCHANGING SUBSTANCES

FIELD OF TECHNOLOGY

The present invention relates to a hollow fiber membrane-type substance exchanger apparatus such as an artificial lung, of a construction wherein a fluid flow generating means for generating a flow of liquid to be supplied to hollow fiber membranes is integrated radially inwardly of a substance exchanger unit comprising the hollow fiber membranes arranged in a tubular or annular column; said apparatus can achieve high efficiency in exchanging substances and suitably structured to be made compact in size.

BACKGROUND ART

The hollow fiber membranes have an advantage in that a substance exchange such as a gas exchange through a membrane is achieved in a high efficiency, and are therefore utilized in various fields for exchanging substances.

By way of example, an artificial lung utilizing the hollow fiber membranes is so designed that, with the use of microporous hollow fiber membranes made of hydrophobic polymer such as polyolefin or gas-permeable homogeneous hollow fiber membranes made of, for example, silicone, gas exchange takes place between oxygen-containing gas and blood through membranes, and is available in two types; an intracapillary-flow type in which the gas flows exteriorly of the hollow fiber membranes while the blood flows through hollow part of the hollow fiber membranes and an extracapillary-flow type in which, in a sense opposite to the intracapillary-flow type, the gas flows through hollow part of the hollow fiber membranes while the blood flows exteriorly of the hollow fiber membranes.

In the intracapillary-flow type, although no channeling (biased flow) of the blood flow occur substantially if the blood is supplied so as to be uniformly distributed to the multiplicity of the hollow fiber membranes, the blood flowing through the hollow part of the hollow fiber membranes represents a laminar flow and, therefore, the hollow fiber membranes must have a reduced inner diameter in order to increase the oxygenating ability (oxygen transfer rate per unitary membrane surface area). In view of this, the hollow fiber membranes having an inner diameter of about 150 to 300 $\mu$m have been developed for use in an artificial lung. However, even though the diameter is so reduced, the oxygenating ability does not increase remarkably so long as the blood flows in a laminar fashion. Moreover, the smaller the inner diameter of the hollow fiber membranes, the more does the clogging (choking of the inside of the hollow fiber membranes due to blood clotting) occurs frequently, posing an obstruction to the practical use.

On the other hand, generally in the artificial lung, several tons of thousands of hollow fiber membranes are bundled and, because of this, special care is required to supply the gas so as to be distributed sufficiently and uniformly over the individual outer walls of the hollow fiber membranes. In the event that the gas is not sufficiently distributed, the carbon dioxide removing ability ($CO_2$ transfer rate per unitary membrane surface area) is lowered.

On the other hand, the extracapillary-flow type is superior to the intracapillary-flow type in that the gas can be distributed satisfactorily accompanied by a minimized loss of pressure of the liquid and, also, it can be easily structured to cause a turbulence in the flow of the blood.

In the extracapillary-flow type, the internal structure of the blood passage has close relations to a shortage of oxygenation due to blood channeling and an occurrence of blood clotting due to stagnation of blood flow, and therefore, proper selection of the structure of the blood passage is extremely important in avoiding these problems.

The extracapillary-flow type artificial lung module comprising the hollow fiber membranes and having a structure to prevent an occurrence of the channeling in the blood flow hither to known includes a module in which baffle plates are disposed in the blood passage.

By way of example, as shown in FIGS. 6A and 6B, the Japanese Laid-open Patent Publication No. 60-193469 discloses an extracapillary-flow type artificial lung module comprising the hollow fiber membranes of a structure having a contacting chamber 21 of a generally elongated rectangular cross-section in which there is defined a plurality of cells 20 separated by blood passages 18 that are constricted by baffle plates 17. In these figures, reference characters X, Y and Z represents the height, the width and the length of each cell 20, respectively.

On the other hand, in applying the substance exchanger apparatus comprising the hollow fiber membranes in various fields, a variety of demands have been proposed, and among them, a reduction in size to provide a compact apparatus is eagerly longed for.

By way of example, an artificial lung compact in size, not of a large size for installation in hospitals or similar establishments, is longed for. In other words, when made compact in size, the artificial lung will be convenient to carry and can quickly be provided for in emergency situations such as an occurrence of acute respiratory failure. Further, when the volume of the apparatus is reduced, the amount of liquid primed in the apparatus can advantageously be minimized enough to lessen the harmful effect which a patient may suffer from, for example, as a result of dilution of the patient's blood with the priming liquid.

The artificial lung thus made compact in size is disclosed in the Japanese Laid-open Patent Publication No. 2-41172, which comprises a housing including outer and inner barrels to define coaxial outer and inner storage spaces, a blood treatment unit disposed within the outer storage space of the housing, and a blood supply mechanism disposed within the inner storage space of the housing. This artificial lung employs the hollow fiber membranes in the blood treatment unit, and is constructed so that blood to be treated can flow exclusively along the axial direction of the hollow fiber membranes.

When the substance exchanger apparatus comprising the hollow fiber membranes is to be made compact in size, the volume of the apparatus in which the hollow fiber membranes are disposed is necessarily reduced, accompanied by a reduction in total membrane surface area. Accordingly, in making the apparatus compact in size, it is necessary to raise the efficiency in exchanging substances for the sake of a satisfactory substance exchange with the reduced total membrane surface area. By way of example, in the case of the artificial lung, the structure of the apparatus must be made so that the blood can be supplied to the outer walls of the hollow fiber membranes efficiently enough to prevent an occurrence of channeling and the blood oxygenated after the gas exchange can be quickly removed from the outer walls of the hollow fiber membranes and the surroundings thereof.

In the hollow fiber membrane-type artificial lung module comprising the baffle plates as shown in FIG. 6, the occurrence of the channeling in the blood flow is not necessarily eliminated sufficiently, and it involves a problem in that the function of the artificial lung tends to be lowered as a result of an occurrence of thrombus at an area where stagnation takes place in blood flow. In addition, the structure of the artificial lung shown in FIG. 6 is not necessarily considered suited for making the artificial lung compact in size.

Even in the compact artificial lung disclosed in the above mentioned Japanese Laid-open Patent Publication No. 2-41172, the blood flows axially of the hollow fiber membranes. Therefore, the problem of channeling in the blood flow is not necessarily be eliminated sufficiently and the possibility cannot be denied that, with passage of time, the gas exchange efficiency tends to be lowered and/or thrombus is apt to occur at the area where blood stagnation takes place.

In view of the foregoing, an object of the present invention is to provide a substance exchange apparatus comprising the hollow fiber membrane, which exhibits a high substance exchange efficiency and which is suited for fabrication in a compact size.

DISCLOSURE OF THE INVENTION

According to the present invention, there is provided a substance exchanger apparatus comprising a substance exchanger unit including a multiplicity of hollow fiber membranes to permit a fluid medium to flow through the hollow part, said hollow fiber membranes being arranged in a tubular or annular column, and a fluid flow generating means disposed radially inwardly of the substance exchanger unit for continuously supplying a liquid medium to the hollow fiber membranes so as to flow in a direction perpendicular to the axial direction of said hollow fiber membranes.

According to the above described construction, the liquid medium can be efficiently supplied to the outer walls of the hollow fiber without being accompanied by channeling. Accordingly, even though the total membrane surface area is relatively small, an efficient substance exchange can be achieved between the liquid medium and the fluid medium flowing through the hollow part of the hollow fiber membranes. Also, since the fluid flow generating means is equipped in the apparatus, the apparatus can be assembled compact in size. Further, because of being compact in size, the amount of priming liquid required to be filled in the apparatus can be minimized.

These advantages are particularly useful when the substance exchange apparatus is used as an artificial lung. Since with the apparatus of the present invention channeling of the blood is hard to occur, the efficient gas exchange can be achieved, and since the possibility of occurrence of a stagnation of the blood flow is minimized, blood clogging within the apparatus is advantageously minimized. Also, since the blood flows in a direction perpendicular to the axial direction of the hollow fiber membranes, a highly efficient substance exchange with a minimized total membrane surface area can be accomplished by supplying the blood to the outer walls of the hollow fiber membranes and removing the blood from the outer walls of the hollow fiber membranes.

Furthermore, as the internal volume of the apparatus is reduced, the amount of blood flowing within the apparatus can be reduced, making it possible to lessen a burden which would be imposed on a patient. In particular, the installation of the fluid flow generating means within the apparatus makes it possible to reduce the size of the apparatus as a whole and, when the apparatus is made compact in size, the amount of priming liquid to be filled in the apparatus at the beginning of operation can be reduced thereby to avoid a harmful influence which a patient may suffer from, for example, as a result of dilution of the blood with the priming liquid.

In a preferred embodiment of the present invention, the fluid flow generating means referred to above is operable to supply the liquid medium in a direction perpendicular to said axial direction so as to traverse at least 70% of the length of that axial portion of the hollow fiber membranes which participate in substance exchange, thereby the efficiency in exchanging substance can be sufficiently increased.

In another preferred embodiment of the present invention, the fluid flow generating means referred to above is constituted by a centrifugal pump. Since the centrifugal pump is compact in size and provides a high discharge pressure, it is suited for use in making the apparatus compact in size.

In a further preferred embodiment of the present invention, rotary vanes forming the centrifugal pump are positioned so as to confront an inner peripheral surface of the substance exchanger unit. Accordingly, a space radially inwardly of the substance exchanger unit is effectively utilized as a storage space for accommodating the rotary vanes.

In a still further preferred embodiment of the present invention, a hollow fiber membrane module is formed by securing opposite open ends of the hollow fiber membranes to respective annular support members while the opposite ends of the hollow fiber membranes are kept open outwardly, and the centrifugal pump is positioned at a central area of a vessel whereas the hollow fiber membrane module is positioned radially outwardly of the vessel. According to this arrangement, assemblage of the apparatus can be easily accomplished since all that are necessary is to insert the centrifugal pump into the central area of the vessel and then to mount the hollow fiber membrane module in the vessel radially outwardly of the pump.

Each of the support members for the hollow fiber membranes employed in the substance exchanger apparatus of the present invention may be made of any suitable material and, where the substance exchanger apparatus is used as an artificial lung, each supporting member may be made of any material without limitation, provided that the chosen material is effective in fixing the hollow fiber membrane stably and in forming blood passages of good liquid conducting property and optionally has a high safety. For example, unsaturated polyester resin, epoxy resin, polyurethane resin, silicone resin or any other similar material may be employed and, when the apparatus of the present invention is used in medical applications such as an artificial lung, polyurethane resin is preferred as it has proven to be of good results.

The hollow fiber membranes may be chosen among any suitable hollow fiber membranes and, so long as a medical application such as an artificial lung is concerned, the hollow fiber membranes made of silicone elastomer resin, polyolefin resin such as, for example, polyethylene or polypropylene, segmented polyurethane, fluorinated alkyl resin or cellulose resin and so on, are employed. In the case of the artificial lung and, more specifically, for the use for a short length of time, microporous polypropylene hollow fiber membranes, microporous polyethylene hollow fiber membranes or the like are advantageously employed. While plasma leakage is undesirable, non-porous membranes may preferably be employed and, in such case, the use is recommended of, for example, three-ply composite hollow fiber membranes (composite hollow fiber membrane of three layers) wherein porous layers are disposed on respective sides of a non-porous layer or two-ply porous hollow fiber membranes (composite hollow fiber membrane of two layers) wherein a thin, but dense non-porous layer is located on an outer surface.

BRIEF DESCRIPTION OF THE DRAWINGS

FIG. 6 illustrates the prior art artificial lung module employing the hollow fiber membranes, wherein

FIG. 7 illustrates a relationship between a fluid flow generating means and the hollow fiber membranes employed in an artificial lung module comprising the hollow fiber membranes according another embodiment of the present invention, wherein

BEST MODE FOR CARRYING OUT THE INVENTION

Hereinafter, the present invention will be described in detail with reference to the accompanying drawings.

Figure 1:
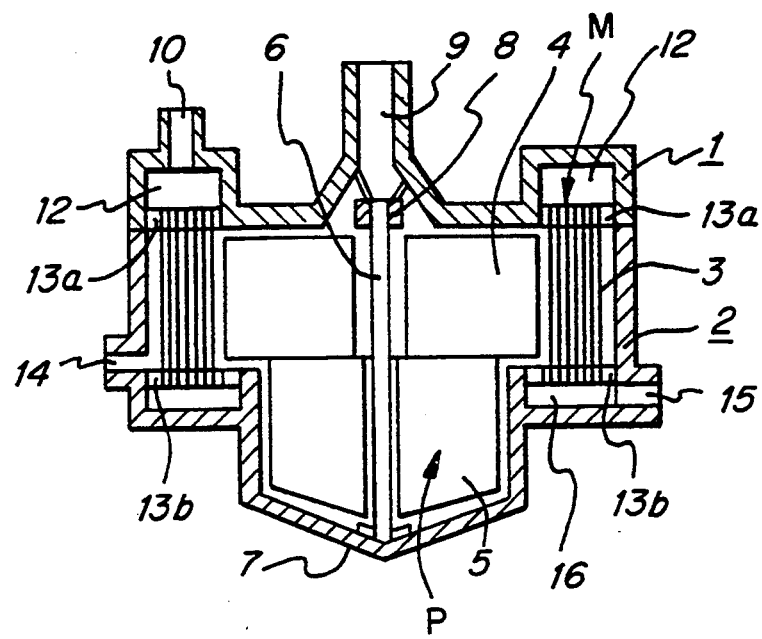
FIG. 1 is a fragmentary longitudinal sectional view of a gas exchange apparatus according to the present invention.
Figure 2:
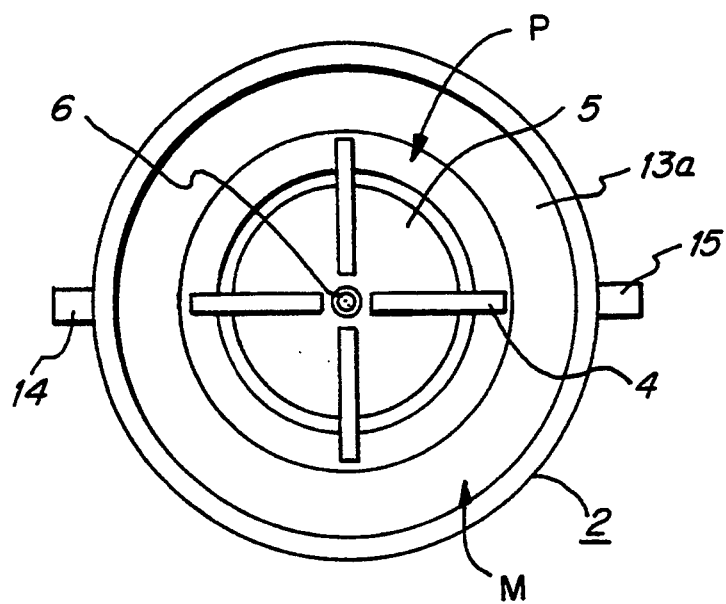
FIG. 2 is a top plan view showing the gas exchange apparatus with a top cover removed.

FIG. 1 is a fragmentary longitudinal sectional view showing a main portion of an example in which a substance exchanger apparatus of the present invention is utilized as an artificial lung, and FIG. 2 is a plan view of FIG. 1 with a top cover 1 removed. The illustrated artificial lung comprises an open-topped vessel 2 so designed and so structured as to accommodate therein a gas exchanger unit including a multiplicity of hollow fiber membranes 3 arranged in a tubular column and a fluid flow generating means for continuously supplying blood to the hollow fiber membranes 3 disposed in the gas exchanger unit.

Figure 3:
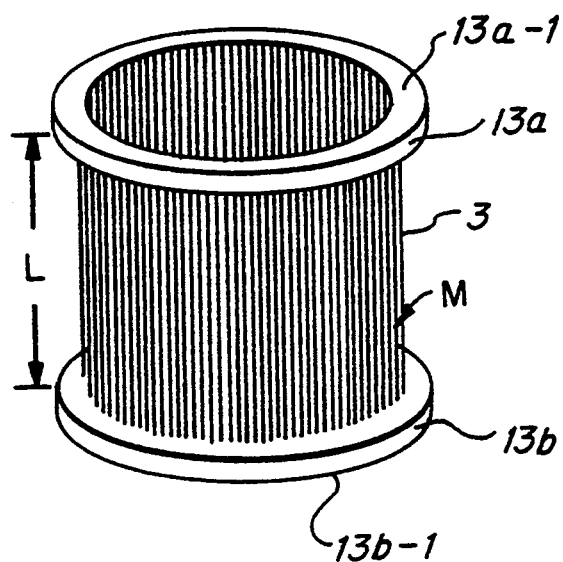
FIG. 3 is a perspective view of a plurality of hollow fiber membranes assembled in a tubular column.

A hollow fiber membrane module M constituting the gas exchanger unit is of a structure as shown in FIG. 3 and comprises annular top and bottom potting members (support members) 13a and 13b made of polymer resin, said hollow fiber membranes 3 being fixedly supported therebetween while opposite open ends of those hollow fiber membranes 3 opening outwardly through the respective annular potting members 13a and 13b. In other words, although not shown, on a top face 13a-1 of the top potting member 13a and on a bottom face 13b-1 of the bottom potting member 13b are exposed the respective open ends of the hollow fiber membranes 3.

It is to be noted that, although in the illustrated embodiment, the hollow fiber membranes 3 are shown as arranged in a tubular column having a right circle cross-section, the cross-sectional shape of the tubular column may not be always limited thereto, but may be oval, polygonal having corners chamfered by curved lines, or any other shape.

Figure 5:
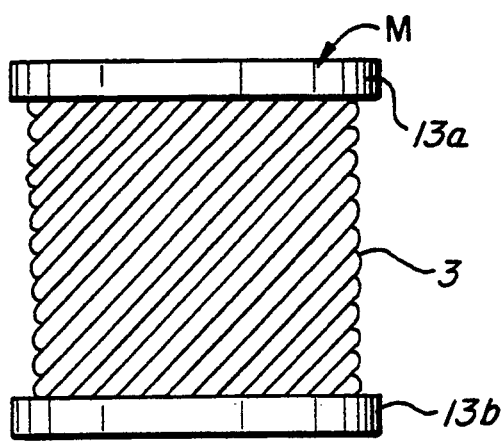
FIG. 5 is a side view showing a tubular column of hollow fiber membranes fixed in a further different manner.

It is also to be noted that,although in the embodiment shown in FIGS. 1 and 3, the hollow fiber membranes 3 in the tubular column have shown to lie perpendicular to any one of the annular potting members 13a and 13b, they may be so supported as to extend slantwise relative to any one of the potting members 13a and 13b at any suitable angle ranging from horizontal to vertical, as shown in FIG. 5.

Figure 4A:
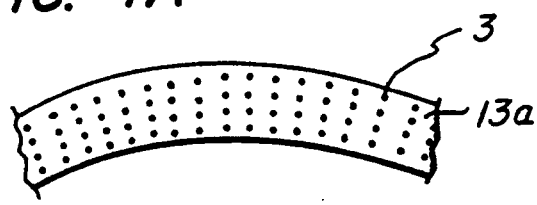
FIG. 4 illustrates different manners in which the hollow fiber membranes are fixed.
Figure 4B:
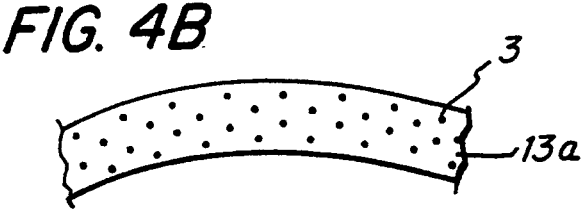

Furthermore, with respect to the arrangement of the hollow fiber membranes, the hollow fiber membranes 3 may be arranged in a plurality of circular rows and in line radially of the tubular column such as shown in FIG. 4A, or in a generally zig-zag fashion in a direction radially of the tubular column as shown in FIG. 4B, or in any other suitable fashion. The space between the potting members 13a and 13b, the length of each hollow fiber membrane 3 (the effective length as described later), the density of the hollow fiber membranes 3 fixed between the potting members 13a and 13b, and so on may be suitably chosen in consideration of the desired performance of the artificial lung.

It is again to be noted that the gas exchanging performance of the artificial lung may be suitably tailored to suit to a particular application of the artificial lung and, for example, it can be tailored to function as an entire or nearly entire substitute for the pulmonary function, or as a partial pulmonary assist device for a patient.

The open ends of the hollow fiber membranes 3 of FIG. 1 secured to the top annular potting member 13a are communicated with an annular region 12 which is in turn communicated with a gas inlet 10 which is fluid connected with a source of a gas, and the open ends of the hollow fibers secured to the bottom annular potting member 13b are communicated with an annular region 16 which is in turn communicated with a gas outlet 15. The regions 12 and 16 and a region of the vessel 2 to which the outer wall of the individual hollow fiber membranes 3 confront are divided by the potting members 13a and 13b and as outer peripheral wall of the vessel 2. While in the illustrated embodiment the gas flows from the gas inlet 10 to the gas outlet 15 through the region 12, then through the hollow part of the hollow fiber membranes 3, and finally through the region 16, the direction of flow of the gas may be reversed with the gas inlet and outlet 10 and 15 serving as gas outlet and gas inlet, respectively.

In this artificial lung, as a fluid flow generating means, a centrifugal pump P of a magnetic coupling type is employed. This centrifugal pump P comprises an impeller having a plurality of vanes 4, a shaft 6 fixed to the support members 7 and 8, and a rotor 5 having a built-in magnet and mounted on the shaft 6 for rotation about the shaft 6 independent of and relative to the shaft 6. This pump P is disposed radially inwardly of the gas exchanger unit constituted by the hollow fiber membranes 3. A magnet adapted to be driven by a suitable motor that is provided when needed is positioned exteriorly of the bottom of the vessel 2 so that a change in magnetic field induced by a rotation of this magnet can cause the rotor 5 to rotate about the shaft 6. The top cover 1 is formed with a fluid receiving port 9 through which a liquid medium is supplied to the pump P, while the vessel 2 is formed with a fluid discharge port 14 through which the liquid medium is outwardly discharged from the pump P.

Thus, when the apparatus is to be assembled, all that necessary are to insert the centrifugal pump P within a central area of the vessel 2 and then to mount the hollow fiber membrane module M generally radially outwardly of the centrifugal pump P, followed by mounting of the top cover 1, and it is therefore clear that the required assemblage is quite simple and easy.

Figure 7A:
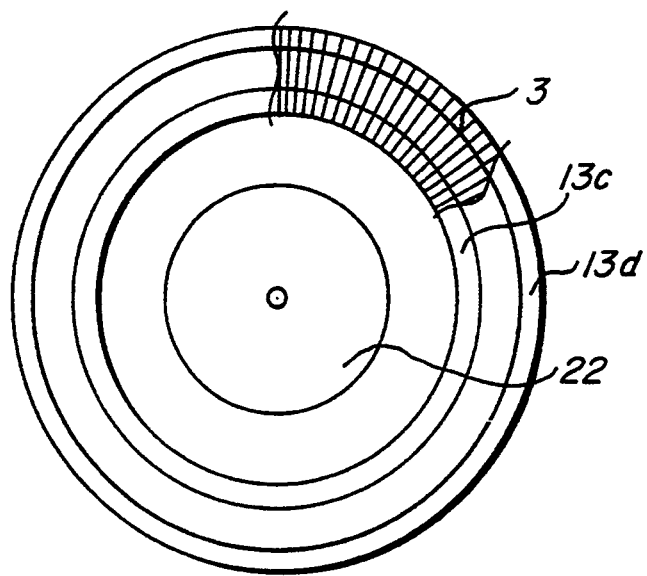
FIG. 7A represents a plan view and FIG. 7B represents a longitudinal sectional view.
Figure 7B:
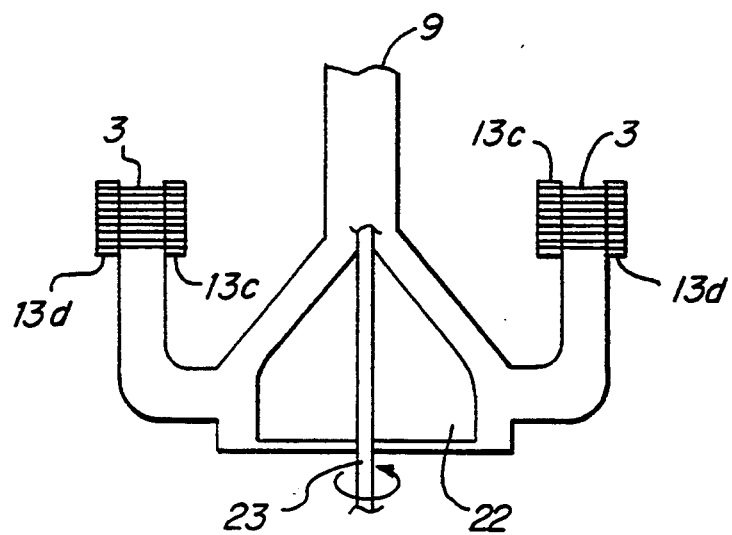

The fluid flow generating means may be of any suitable construction provided that an efficient continuous supply of blood to the hollow fiber membranes 3 can be achieved. Thus, the fluid flow generating means may be employed in the form of, for example, other than the centrifugal pump of the magnetic coupling type shown in FIG. 1, a pump of a type having a shaft drivingly coupled with a drive unit such as a drive motor, a friction pump, or a cone-type centrifugal pump such as a Bio-pump ® shown in FIGS. 7A and 7B which is different from an impeller type shown in FIG. 1.

In the apparatus shown in FIG. 7, the hollow fiber membranes 3 have their opposite open ends secured by inner and outer annular potting members 13c and 13d so as to open outwardly while extending therebetween in a direction radially of the center of the annular shape of each potting member 13c and 13d. For example, a surface of the inner annular potting member 13c at which one ends of the hollow fiber membranes 3 open is adapted to receive a gas to be introduced into the hollow part of each hollow fiber membranes 3, while a surface of the outer potting member 13d at which the opposite ends of the hollow fiber membranes 3 open is adapted to discharge the gas which has been used for gas exchange. It is to be noted that the direction of supply of the gas may be reversed to that described above. In this apparatus shown in FIG. 7, blood introduced through the fluid receiving port 9 is pumped by the cone-type centrifugal pump having a cone 22 mounted on a rotary shaft 23, so as to flow in a direction perpendicular to the axial direction of each hollow fiber membrane 3 and then into the gas exchanger unit in which the hollow fiber membranes 3 are fixedly installed.

In order to achieve a high efficiency in gas exchange with the channeling phenomenon suppressed satisfactorily, the direction of supply of the blood to be treated towards the hollow fiber membranes 3 in the apparatus of the present invention must lie perpendicular to the axial direction of each hollow fiber membrane. Also, while the fluid flow generating means and that portion of the vessel 2 within which the blood flows are suitably so designed and structured as to accomplish an efficient flow of the liquid medium without being accompanied by the channeling of the liquid, design should be adopted such that the blood being supplied can flow substantially perpendicular to the axial direction of each hollow fiber membrane 3 over a distance corresponding to at least 70%, preferably 80% or more preferably 90%, of the effective length of each hollow fiber membrane 3, that is, the length L (FIG. 3) of that portion of each hollow fiber membrane 3 which are exposed to the blood so as to participate in actual gas exchange. Also, if that portion within the vessel 2 which is filled with the blood has a reduced capacity, the quantity of the liquid medium primed in the apparatus at the beginning of operation can advantageously be minimized. When the apparatus is primed with a biocompatible fluid medium other than the blood, for example, physiological saline solution, aqueous glucose solution, Ringer's solution of Hartmann's solution, the possibility of a patient suffering from a harmful effect which would be brought about when the blood is diluted by such biocompatible fluid medium can be avoided, and when the apparatus is primed with blood from the other people, the possibility of a patient being transfused with such blood can be advantageously eliminated.

Hereinafter, the operation in the gas exchange with the illustrated artificial lung will be described.

At the outset, the apparatus shown in FIG. 1 is primed with the biocompatible fluid medium, for example, physiological saline solution, aqueous glucose solution, Ringer's solution or Hartmann's solution. The blood is supplied through the blood receiving port 9 while the apparatus is so primed, and a change in magnetic field is acted on the rotor 5 by means of an external drive means (not shown) to drive the rotor 5 about the shaft 6 in one predetermined direction at a predetermined number of revolutions. The number of revolutions of the rotor 5 at this time may be suitably chosen in consideration of the required pulmonary function accomplished by the artificial lung. By the effect of rotation of the impeller 4 accompanying the rotation of the rotor 5, the blood introduced through the blood receiving port 9 is supplied in a centrifugal direction about the axis of rotation so as to flow perpendicular to the axial direction of each hollow fiber membrane 3 across the hollow fiber membranes 3.

On the other hand, the gas (oxygen, or a gaseous mixture of oxygen diluted by nitrogen, etc.) introduced through the gas inlet 10 is supplied into the hollow part of each hollow fiber membrane 3 from top open ends thereof through the annular region 12. Accordingly, as the blood flows through interstices among the hollow fiber membranes 3 in contact with outer peripheral surfaces of the respective hollow fiber membranes 3, a gas exchange takes place between the blood and the gas through a membrane forming each hollow fiber membrane 3.

The blood oxygenated as a result of the gas exchange is further supplied in the centrifugal direction during a continued rotation of the rotor 5 towards an inner surface of the outer peripheral wall of the vessel 2 and is then discharged to the outside through the fluid discharge port 14, thereby returning to the patient's vascular system. On the other hand, the gas passed through the hollow part of each hollow fiber membrane 3 is discharged from bottom open ends of the hollow fiber membranes 3 into the region 16 and then to the outside through the gas outlet 15. It is to be noted that the discharge of the gas having been used for the gas exchange may be effected directly through the bottom open ends of the hollow fiber membranes 3 and, for this purpose, the bottom open ends of the hollow fiber membranes 3 may be exposed directly to the outside.

While the substance exchanger apparatus of the present invention has been described used as an artificial lung, the apparatus of the present invention is not always limited to the use as an artificial lung, but may be used as a cardiac assist device, an extracorporeal circulation device for use during an open heart surgical operation, or an organ perfusion storage device. The apparatus of the present invention may be used not only for a substance exchange between gas and liquid such as accomplished in an oxygenating device for supplying oxygen into a liquid medium and a degasificating device for removing a gaseous medium from a liquid medium, but also for a substance exchange between liquid and liquid such as required in an artificial kidney and an artificial liver. It is however to be noted that the details of structure of various component parts of the apparatus of the present invention may be tailored to suit to a particular application of the apparatus of the present invention.

The present invention will now be demonstrated by way of a non-limitative example.

EXAMPLE 1

Using a multiplicity of three-ply hollow fiber membranes (composite hollow fiber membrane of three layers) each of which consisting of a microporous polyethylene layer (outer layer) of 5 μm in thickness, a non-porous segmented polyurethane layer (intermediate layer) of 1 μm in thickness, and a microporous polyethylene layer (inner layer) of 19 μm in thickness, respectively, and having an outer diameter of 250 μm, an inner diameter of 200 μm and a pore diameter of 0.05 to 0.01 μm, a hollow fiber membrane module similar in structure to that shown in FIG. 3 was assembled by stringing the follow fibers, laid in a plane in closely juxtaposed fashion, together with transversely extending polyester threads of 20 μm in diameter to provide a substantially planar web of the juxtaposed hollow fiber membranes of an interval of 80 μm, then rolling the substantially rectangular web of the hollow fiber membranes to provide a tubular column of the hollow fiber membranes, successively securing the annular potting members, made of polyurethane, to opposite ends of the tubular column, and finally slicing an outer annular surface region of each of the annular potting members transversely of the axial direction of the tubular column to allow opposite ends of the hollow fiber membranes to open outwardly thereby to complete the hollow fiber membrane module. The hollow fiber membranes forming the resultant hollow fiber membrane module had a total membrane surface area of 0.3 m².

Subsequently, an artificial lung of a structure substantially similar to that shown in FIG. 1 was assembled with the use of the resultant hollow fiber membrane module. In this artificial lung so assembled, the axial length of each vane forming the impeller 4 shown in FIG. 1, as measured in a direction parallel to the shaft 6, was chosen to be substantially equal to the effective length L of the hollow fiber membranes 3, and the blood to be treated was supplied to the hollow fiber membranes 3 in a direction perpendicular to the axial direction of each hollow fiber membrane 3 over a distance corresponding to 95% of the effective length L of the hollow fiber membranes.

Following the above described assembling method, artificial lungs of a structure similar to that shown in FIG. 1, but for use on infant and adult patients were assembled. The artificial lung for use on the infant patient was so sized as to have a diameter of 4.5 cm, a height of 2 cm and a membrane surface area of 0.2 to 0.4 m² whereas the artificial lung for use on the adult patient was so sized as to have a diameter of 6 cm, a height of 3 cm and a membrane surface area of 0.4 to 0.6 m².

Figure 8:
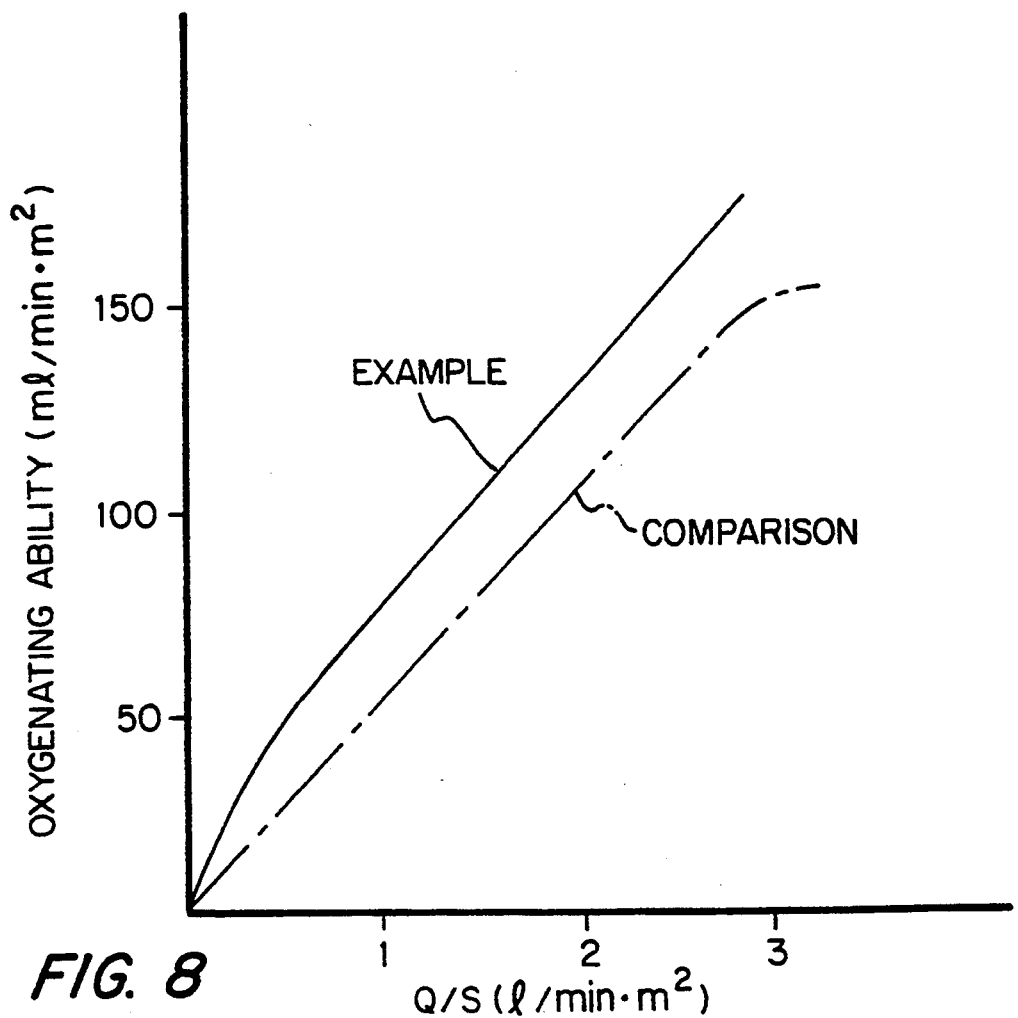
FIG. 8 is a characteristic graph showing a change in oxygenating ability with the blood flow rate measured in connection with Example 1 and Comparative Example 1.

The resultant hollow fiber membrane modules were tested under the following conditions to determine the oxygenating ability ($TO_2$: ml/min.m²) per unitary membrane surface area of the hollow fiber membranes relative to the flow of the blood (Q/S: lit/min.m²). Results of the test are shown in FIG. 8. Measurement of Oxygenating Ability:

Blood Used: Fresh heparin-added bovine blood (37° C., 35% hematocrit, pH 7.32, 65 mmHg in oxygen partial pressure, and 12.5 g/dl in hemoglobin concentration).

Gas Introduced Into Hollow fiber membranes: Pure oxygen (37° C. in temperature and 2 lit/min in flow rate)

Temperature of Inside of Hollow Fiber Membrane Module: 37° C.

Equation for Determining Oxygenating Ability:

$$TO_2 = \{3 \times 10^{-5}(PaO_2) - PvO_2) + 134 \times 10^{-4} Hb \cdot (SaO_2 - SvO_2)\} 1,000 \cdot Q/S$$

wherein:
$PO_2$: Oxygen Partial Pressure (mmHg)
$PCO_2$: $CO_2$ Partial Pressure (mmHg)
$SO_2$: Oxygen Saturation Factor (%)
$CCO_2$: $CO_2$ Content (vol %)
Hb: Hemoglobin Content (g/dl)
Q: Blood Flow Rate (lit/min)
S: Total Membrane Surface Area (m²)
(Lower case affixes "a" and "v" used in connection with the oxygen partial pressure and the oxygen saturation factors, respectively denote those measured at outlet and inlet of the artificial lung, respectively.)

COMPARATIVE EXAMPLE 1

Figure 6A:
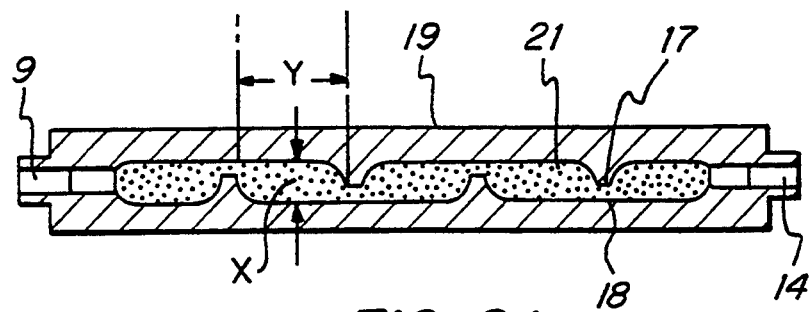
FIG. 6A represents a longitudinal sectional view and FIG. 6B represents a plan view with a portion cut away.
Figure 6B:
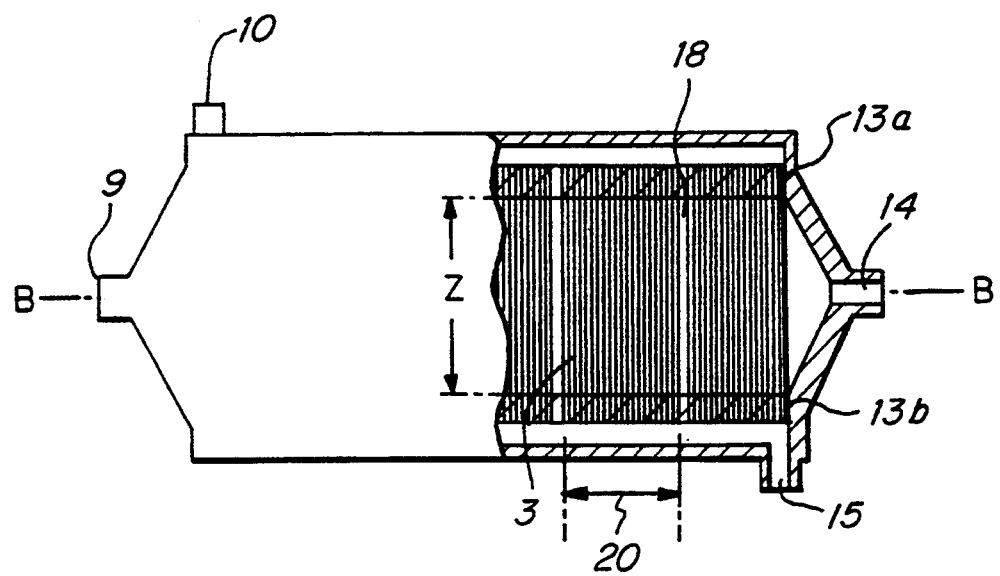

Using a hollow fiber membrane module of a design wherein hollow fiber membranes of the same kind as those employed in Example 1 above, were secured together by means of polyurethane supporting member while opposite ends of the hollow fiber membranes were allowed to open outwardly, and fixedly positioning the hollow fiber membrane module at a predetermined location within a housing made of polycarbonate, an extracapillary-flow type artificial lung of the hollow fiber membrane type was assembled, having a structure shown in FIGS. 6A and 6B. This extracapillary-flow type artificial lung of the structure shown in FIGS. 6(A) and 6(B) had 5 cells each being 0.6 cm in chamber height X. 1.8 cm in chamber width Y and 20.0 cm in chamber length Z and having the respective cell in which the hollow fiber membranes were filled so as to occupy 30% of the volume of the cell. Within the contacting chamber, the total membrane surface area was 0.5 m².

This prior art hollow fiber membrane module was tested under the same conditions as set forth under Example 1 to determine the oxygenating ability thereof, a result of which is shown in FIG. 8. As compared with that under Example 1, the prior art hollow fiber membrane module has exhibited a low oxygenating ability.

INDUSTRIAL APPLICABILITY

The apparatus of the present invention is used as, other than the artificial lung referred to in the foregoing description, a cardiac assist device, an extracorporeal) circulation device for use during an open heart surgical operation, or an organ perfusion storage device. The apparatus of the present invention may be used not only for a substance exchange between gas and liquid such as accomplished in an oxygenating device for supplying oxygen into a liquid medium and a degasificating device for removing a gaseous medium from a liquid medium, but also for a substance exchange between liquid and liquid such as required in an artificial kidney and an artificial liver. The details of structure of various component parts of the apparatus of the present invention may however be tailored to suit to a particular application.

What is claimed is:

1. A substance exchanger apparatus which comprises a substance exchanger unit including a multiplicity of hollow fiber membranes, and inlet and outlet means to permit a fluid medium to flow through the hollow part, said hollow fiber membranes being arranged in a tubular or annular column and having a center thereof, and a fluid flow generating means disposed radially inwardly at said center of said column for continuously supplying a liquid medium to the hollow fiber membranes so as to flow in a direction perpendicular to the axial direction of said hollow fiber membranes.

2. The substance exchanger apparatus as claimed in claim 1, wherein said fluid flow generating means includes means operable to supply the liquid medium in a direction perpendicular to said axial direction so as to traverse at least 70% of the length of that axial portion of the hollow fiber membranes which participate in substance exchange.

3. The substance exchanger apparatus as claimed in claim 1, wherein the fluid flow generating means is constituted by a centrifugal pump.

4. The substance exchanger apparatus as claimed in claim 3, wherein said centrifugal pump has rotary vanes positioned so as to confront an inner peripheral surface of the substance exchanger unit.

5. The substance exchanger apparatus as claimed in claim 3, wherein said hollow fiber membranes are secured at opposite open ends thereof by means of respective annular support members while the open ends of the hollow fiber membranes are kept open outwardly, thereby completing a hollow fiber membrane module, wherein said centrifugal pump is positioned at a central area of a vessel, and wherein said hollow fiber membrane module is positioned radially outwardly of the vessel.

* * * * *